(12) United States Patent
Sun

(10) Patent No.: US 8,606,009 B2
(45) Date of Patent: Dec. 10, 2013

(54) HIGH DYNAMIC RANGE IMAGE GENERATION AND RENDERING

(75) Inventor: Shijun Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 12/700,292

(22) Filed: Feb. 4, 2010

(65) Prior Publication Data

US 2011/0188744 A1   Aug. 4, 2011

(51) Int. Cl.
*G06K 9/00* (2006.01)
*G06T 5/20* (2006.01)
*G06T 5/40* (2006.01)
*G09G 5/02* (2006.01)

(52) U.S. Cl.
USPC ......... 382/169; 382/168; 382/274; 345/589; 345/590; 345/690

(58) Field of Classification Search
USPC ......... 382/169, 168, 274; 345/589, 590, 690
See application file for complete search history.

(56) References Cited

U.S. PATENT DOCUMENTS

| | | | |
|---|---|---|---|
| 6,850,642 B1 * | 2/2005 | Wang ............................. | 382/169 |
| 6,879,731 B2 | 4/2005 | Kang et al. | |
| 7,010,174 B2 | 3/2006 | Kang et al. | |
| 7,061,524 B2 | 6/2006 | Liu | |
| 7,142,723 B2 | 11/2006 | Kang et al. | |
| 7,239,757 B2 | 7/2007 | Kang et al. | |
| 7,305,144 B2 * | 12/2007 | Fattal et al. ................... | 382/274 |
| 7,382,931 B2 | 6/2008 | Kang et al. | |
| 7,454,136 B2 | 11/2008 | Raskar | |
| 7,557,832 B2 | 7/2009 | Lindenstruth | |
| 7,636,496 B2 | 12/2009 | Duan et al. | |
| 7,639,893 B2 * | 12/2009 | Duan et al. .................... | 382/274 |
| 7,822,272 B2 * | 10/2010 | Lei ................. | 382/168 |
| 7,933,462 B2 * | 4/2011 | Ward ............................ | 382/254 |
| 8,270,759 B2 * | 9/2012 | El-Mahdy et al. ............ | 382/276 |
| 2004/0044732 A1 * | 3/2004 | Fushiki et al. ................ | 709/205 |

(Continued)

FOREIGN PATENT DOCUMENTS

| | | |
|---|---|---|
| KR | 10-2005-0009694 A | 1/2005 |
| KR | 10-2006-0012278 A | 2/2006 |
| KR | 10-2007-0111391 A | 11/2007 |

OTHER PUBLICATIONS

Ashikhmin, Michael. "A Tone Mapping Algorithm for High Contrast Images." Eurographics Workshop on Rendering. (2001): 1-11. Print.*

(Continued)

*Primary Examiner* — Michael A Newman
(74) *Attorney, Agent, or Firm* — Klarquist Sparkman, LLP

(57) ABSTRACT

Techniques and tools for high dynamic range (HDR) image rendering and generation. An HDR image generating system performs motion analysis on a set of lower dynamic range (LDR) images and derives relative exposure levels for the images based on information obtained in the motion analysis. These relative exposure levels are used when integrating the LDR images to form an HDR image. An HDR image rendering system tone maps sample values in an HDR image to a respective lower dynamic range value, and calculates local contrast values. Residual signals are derived based on local contrast, and sample values for an LDR image are calculated based on the tone-mapped sample values and the residual signals. User preference information can be used during various stages of HDR image generation or rendering.

24 Claims, 11 Drawing Sheets

(56) References Cited

U.S. PATENT DOCUMENTS

| | | | |
|---|---|---|---|
| 2004/0218830 | A1 | 11/2004 | Kang et al. |
| 2005/0013501 | A1 | 1/2005 | Kang et al. |
| 2005/0047676 | A1 | 3/2005 | Kang et al. |
| 2005/0099504 | A1 | 5/2005 | Nayar |
| 2005/0104900 | A1* | 5/2005 | Toyama et al. ............... 345/629 |
| 2005/0243177 | A1 | 11/2005 | Kang et al. |
| 2006/0133688 | A1 | 6/2006 | Kang et al. |
| 2006/0158462 | A1* | 7/2006 | Toyama et al. ............... 345/629 |
| 2007/0014470 | A1 | 1/2007 | Sloan |
| 2007/0201560 | A1 | 8/2007 | Segall |
| 2007/0268534 | A1 | 11/2007 | Duan et al. |
| 2008/0131016 | A1* | 6/2008 | Kokemohr ................... 382/254 |
| 2009/0180555 | A1 | 7/2009 | Sun et al. |
| 2010/0172411 | A1* | 7/2010 | Efremov et al. ......... 375/240.12 |

OTHER PUBLICATIONS

Lu, et al. "Realistic HDR Tone-Mapping based on Contrast Perception Matching." Image Processing (ICIP), 2009 16th IEEE International Conference on. (2009): 1789-1792. Print.*

Ward, et al. "JPEG-HDR: A Backwards-Compatible, High Dynamic Range Extension to JPEG." Proceedings of the Thirteenth Color Imaging Conference. (2005): 283-290. Print.*

U.S. Appl. No. 12/197,922, filed Aug. 25, 2008, Sun et al.

Drago et al., "Design of a Tone Mapping Operator for High Dynamic Range Images based upon Psychophysical Evaluation and Preference Mapping," Human Vision and Electronic Imaging VIII, Santa Clara, California, Jan. 2003 <http://www.mpi-inf.mpg.de/resources/hdr/TMO/tonemapSpie.pdf>, 11 pages.

Gallo et al., "Artifact-Free High Dynamic Range Imaging," IEEE Int'l Conf. on Computational Photography, San Francisco, Apr. 2009 <http://users.soe.ucsc.edu/~orazio/papers/GalloICCP09_red.pdf>, 7 pages.

Microsoft Corp., "Bill Crow's Digital Imaging & Photography Blog," <http://blogs.msdn.com/billcrow/archive/2009/07/29/jpeg-xr-is-now-an-international-standard>, 2 pages, accessed Jan. 4, 2010.

Qiu and Duan, "Hierarchical Tone Mapping for High Dynamic Range Image Visualization," Visual Communications and Image Processing 2005, Jun. 2005 <http://www.cs.nott.ac.uk/~qiu/webpages/Papers/vicp2005final.pdf>, 9 pages.

Tang, "Layered HDR Tone Mapping," Photoshop Tutorials, <http://photoshoptutorials.ws/photoshop-tutorials/general/basics/hdr-photos-and-photoshop>, 12 pages, May 30, 2007.

Tang, "HDR Photos and Photoshop," Photoshop Tutorials, <http://photoshop-tutorials/general/basics/hdr-photos-and-photoshop>, 13 pages, Apr. 6, 2008.

Wikipedia, "Cross-correlation," <http://en.wikipedia.org/wiki/Cross-correlation#Normalized_cross-correlation>, 4 pages, accessed Dec. 30, 2009.

Wikipedia, "High dynamic range rendering," <http://en.wikipedia.org/wiki/High_dynamic_range_rendering>, 7 pages, accessed Jan. 5, 2010.

International Search Report and Written Opinion for International Application No. PCT/US2011/021441, dated Sep. 19, 2011, 11 pages.

* cited by examiner

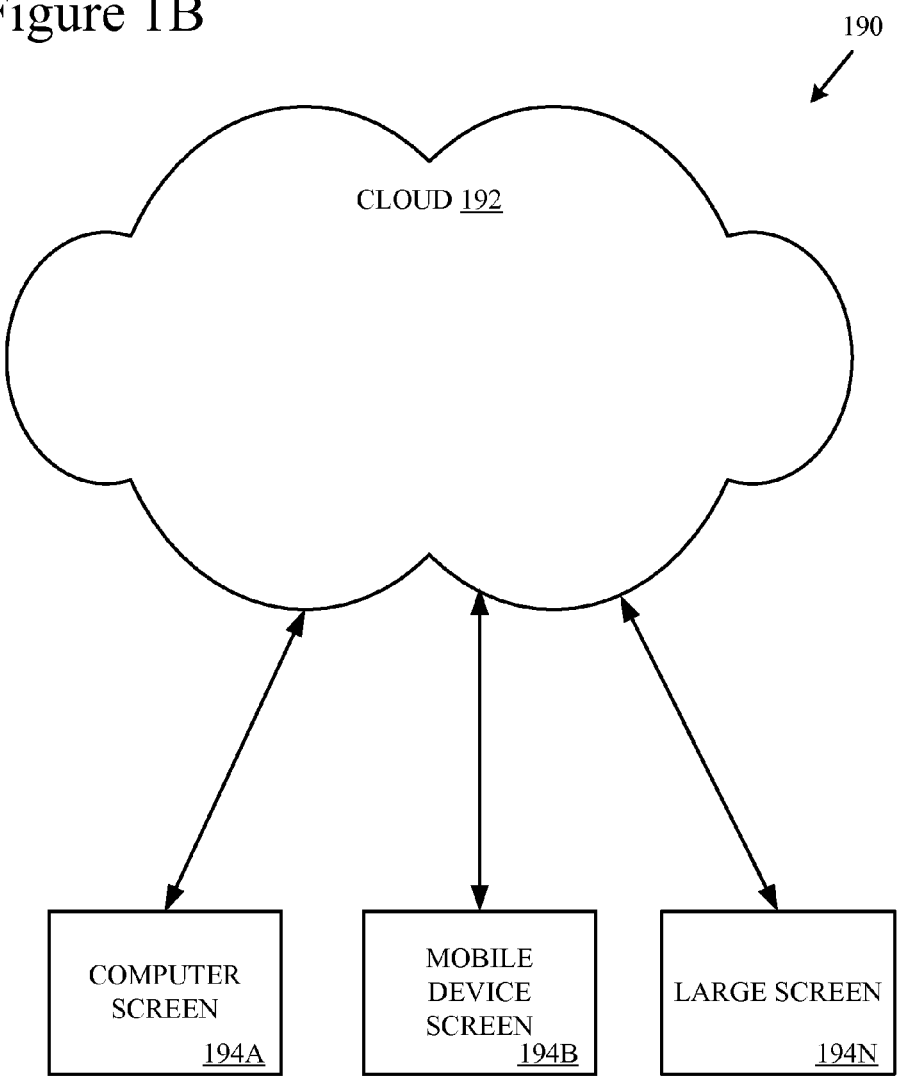

HIGH DYNAMIC RANGE IMAGE GENERATION AND RENDERING

FIELD

The technology relates to generating and rendering digital images, and more particularly relates to generating and rendering high dynamic range digital images.

BACKGROUND

In video and imaging systems, color generally is represented as vector coordinates in a multi-dimensional "color space" having three or more channels. Common examples include the well-known classes of RGB and YUV color spaces. The RGB color spaces specify pixel values using coordinates that represent intensities of red, green and blue light, respectively. The YUV color spaces specify pixel values using coordinates that represent a luminance or chrominance value.

Currently, many image capture, processing and display devices can only handle pixel values with a small dynamic range of 256 ($2^8$) discrete values per channel, represented by 8 bits. Such images can be described as having a "bit depth" of 8 bits. In a typical RGB digital image having 8 bits per channel (8 bpc) in red, green and blue color channels, only 256 different values are possible for each of the red, green and blue values. Other values (e.g., alpha or opacity values, luminance, etc.) also may be constrained by low dynamic range limitations. Some devices can handle up to a 10- or 12-bit dynamic range per channel. However, the human vision system can detect a wide luminance range of 14 orders of magnitude, which translates to around 46 bits. Luminance values in nature can be as high as $10^8$ candela/$m^2$ in bright sunlight, and as low as $10^{-6}$ candela/$m^2$ on the underside of a rock on a moonless night.

High dynamic range (HDR) imaging presents a more versatile and natural image representation in line with the human vision system. HDR images can present a dynamic range higher than the traditional 8-bit, 10-bit and 12-bit representations to achieve a far higher image quality. HDR images can be used in the same kinds of devices and software tools that process conventional images if the HDR image format is compatible with the device or tool. Several HDR image formats have been developed, and cameras, computer graphics and display devices have begun to produce, process and display images with increasing dynamic ranges. HDR images also can be constructed from a collection of lower dynamic range images. See Debevec et al., "Recovering High Dynamic Range Radiance Maps from Photographs," *SIGGRAPH '97* (August 1997).

Various prior techniques have addressed problems associated with displaying or processing high resolution and/or high dynamic range images.

U.S. Pat. No. 7,120,293 describes an "interactive image" where each pixel location in the interactive image is assigned to one of several representative images having different characteristics. Image processing techniques are employed to determine which one of the several representative images represents the best exposure level or focus setting in connection with the selected pixel location.

U.S. Pat. No. 7,492,375 describes HDR viewers that allow one or more specific regions of interest in an HDR image to be selected and displayed. In the regions of interest, an HDR viewer displays the corresponding portion or portions of the HDR image. The corresponding portion or portions vary in some way from the original HDR image. For example, a portion of an HDR image corresponding to a region of interest can be tone-mapped to a different dynamic range.

A publicly available application called HDRView allows a user to open an HDR image on a lower dynamic range display and shift-click on a selected pixel location in an HDR image to vary the exposure of the image in accordance with the exposure level at the selected pixel location. A description of HDRView is available at http://athens.ict.usc.edu/FiatLux/hdrview/.

Engineers also use compression (also called coding or encoding) to reduce the amount of bits that are required to represent digital media such as HDR or SDR digital images. Compression decreases the cost of storing and transmitting a digital image by converting it into a lower bit rate form. Decompression (also called decoding) reconstructs a version of the original image from the compressed form. A "codec" is an encoder/decoder system.

Perceptible flaws in digital images after encoding or other processing are sometimes called artifacts, as they result from and show that the encoding or other processing occurred. These artifacts include blocking artifacts, banding artifacts and ringing artifacts.

Block patterns that are introduced by compression and appear in reconstructed images are often called block artifacts. Block artifacts can be especially noticeable in smoothly varying, gradient regions, such as an image of a clear sky. Block artifacts result, for example, from splitting an image into blocks for encoding, where the encoding includes a frequency transform process and quantization of AC coefficients for the blocks. Banding or contouring artifacts occur, for example, when sample values in an image are converted from a high bit resolution (e.g., 10 bits or 12 bits per sample value) to a lower bit resolution (e.g., 8 bits per sample value). When sample values are clipped to the lower bit resolution, steps between bands of values may become perceptible, especially in regions with smoothly changing sample values (e.g., a gradual transition from light to darker). Ringing artifacts can appear as a ripple pattern or other band of noise going away from the edge of the artifact into the background of the picture. Ringing artifacts can result from a frequency transform process and quantization for a block that includes the object or part of the object. Ringing artifacts can also be introduced at edges by excessive sharpening during editing.

Some post-processing approaches to controlling artifacts process images after decoding so as to smooth over or otherwise hide artifacts. Some systems adaptively filter across block boundaries to reduce the visibility of block artifacts. Other systems use dithering during post-processing to adjust the sample values of reconstructed pictures. For example, dithering can introduce small adjustments to values around a jagged edge so that the human viewer "averages" the values and perceives a smoother edge.

Whatever the benefits of previous techniques, they do not have the advantages of the techniques and tools presented below.

SUMMARY

Techniques and tools for high dynamic range (HDR) image rendering and generation are described. In several described embodiments, an HDR image generating system performs motion analysis on a set of lower dynamic range (LDR) images and derives relative exposure levels for the images based on information obtained in the motion analysis. These relative exposure levels are used when integrating the LDR images to form an HDR image. In several described embodiments, an HDR image renderer tone maps sample values in an HDR image to a respective lower dynamic range value, and calculates local contrast values. Residual signals are derived based on local contrast, and sample values for an LDR image are calculated based on the tone-mapped sample values and the residual signals. User preference information can be used during various stages of HDR image generation or rendering.

In one aspect, motion analysis is performed relative to a reference image in a set of digital images depicting a scene. The reference image can be selected (e.g., based on user preference information or a detected exposure range in the image). The motion analysis comprises determining image differences for each of one or more non-reference images in the set, relative to the reference image. Based at least in part on the motion analysis, one or more relative exposure levels relative to the reference image are derived for each non-reference image. For example, relative exposure levels are derived based on sample values converted to a linear domain, and an average sample ratio for a respective non-reference image. Based at least in part on the relative exposure levels, the set of plural digital images is integrated to form an HDR image depicting the scene. Sample values can be scaled to a normalization level based on the relative exposure levels. Pre-processing can be performed (e.g., before motion analysis) to remove image artifacts in the images that are being integrated to form the HDR image.

The motion analysis can include using normalized cross correlation to determine the image differences relative to the reference image. The motion analysis can include selecting a subset of sample values in a non-reference image to determine the image differences relative to the reference image, the subset being selected based on whether the sample values fall within a range of exposure values. The motion analysis can include global motion analysis followed by local motion refinement. The motion analysis can include determining a motion vector for one or more pixels in each of the one or more non-reference images.

The integration can include calculating, for each sample position in the HDR image, a weighted average of a sample value corresponding to the sample position in the reference image and a scaled sample value corresponding to the sample position in each non-reference image. For example, a weighting factor w for each sample value s in the weighted average is calculated based on a confidence level, a relative exposure value, and a positive exponent (e.g., 0.5). The confidence level can vary based on the sample value. For example, the confidence level is less for more extreme (e.g., very bright or very dark) sample values.

In another aspect, an HDR image is rendered as an LDR image. Sample values in the HDR image are tone mapped to respective lower dynamic range values. A local contrast value is calculated for each of the tone-mapped sample values. A residual signal is derived for each of the tone-mapped sample values, based at least in part on the respective local contrast value. For example, each tone-mapped sample value is multiplied by the respective local contrast value. Scaling and filtering can be applied to the residual signals. The scaling can include applying a scaling factor that is a function of the tone-mapped sample value that corresponds to the respective residual signal. Sample values are calculated for the LDR image based at least in part on the tone-mapped sample values and the respective residual signals. For example, a sample values for the LDR image can be calculated by combining a tone-mapped sample value, a residual signal and a high-frequency dithering signal, and mapping to an integer value in the range of 0 to 255 inclusive. The LDR image can then be displayed or processed in some other way. Preprocessing (e.g., picture resizing, explicit exposure adjustment, explicit dynamic range adjustment, color temperature adjustment, color enhancement) can be performed on the HDR image prior to the tone-mapping.

The tone-mapping can include generating a global tone mapping lookup table and identifying an LDR value for sample values in the HDR image, such as by performing lookups in the lookup table. The global tone mapping lookup table can be generated based on an adaptive gamma function. The tone mapping can be applied to a lower-resolution preview version of the HDR image, or to full-resolution version of the HDR image. For example, tone mapping applied to a preview version of an image can be applied to a full-resolution version of the image when saving a final image. Modified tone mapping parameters can be applied to copies of the HDR image, and the tone-mapped versions can be displayed in a sequence, e.g., to produce an animation effect.

In another aspect, one or more user preference controls are provided for setting user preferences for HDR image rendering parameters. For example, user-adjustable controls can be provided via a user interface as part of an image editing application. User preference information is received from the user preference controls. The user preference information corresponds to HDR image rendering parameters for an HDR image file containing an HDR image. The HDR digital image is rendered based at least in part on the user preference information. The rendering includes calculating a local contrast value for each of plural tone-mapped sample values, and calculating sample values for an LDR image based at least in part on the local contrast values for the respective tone-mapped sample values.

User preference information associated with a single user or multiple users can be stored as metadata in an image file. For example, user identity information can be stored along with user preference information and the user identity information can be linked to a respective user. Storing the user preference information as metadata can facilitate preserving original HDR image information in the file. User preference controls can include, for example, signal scaling controls, signal filtering controls, gamma controls, color enhancement controls, resizing controls, color temperature controls, and white point controls.

The foregoing and other objects, features, and advantages of the invention will become more apparent from the following detailed description, which proceeds with reference to the accompanying figures.

BRIEF DESCRIPTION OF THE DRAWINGS

FIG. 1B illustrates a generalized example of a suitable implementation environment in which described embodiments may be implemented.

DETAILED DESCRIPTION

Described techniques and tools involve different aspects of generating and rendering high dynamic range (HDR) digital images, and related user interface features.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific digital media formats, other formats also can be used.

The various techniques and tools can be used in combination or independently. Different embodiments implement one or more of the described techniques and tools. Some techniques and tools described herein can be used in a computer system with software for processing digital still images, or in some other system not specifically limited to processing digital still images. For example, techniques and tools described herein can be used to process digital video.

I. Example Computing Environment

Figure 1A:
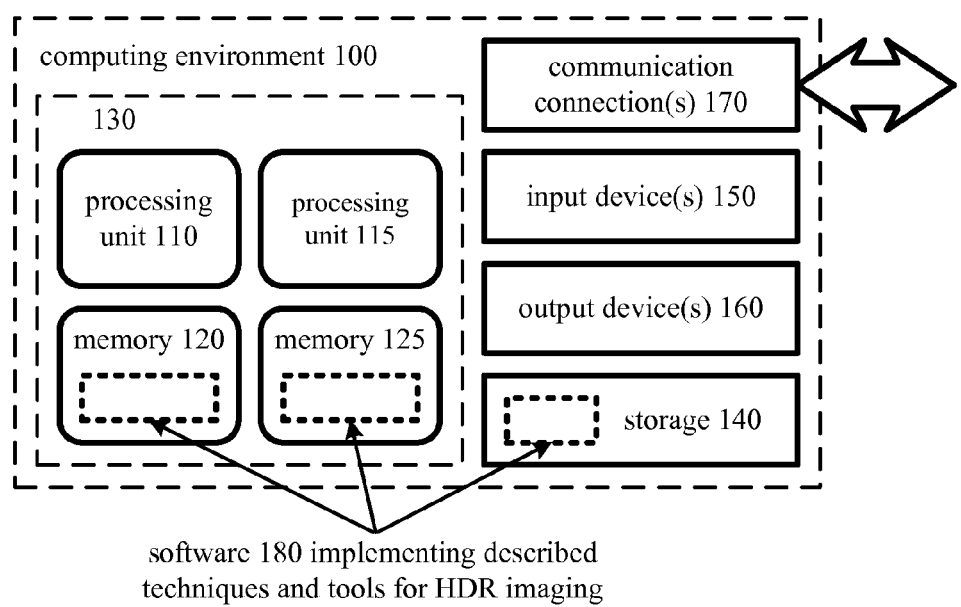
FIG. 1A illustrates a generalized example of a suitable computing environment 100 in which several of the described embodiments may be implemented.

FIG. 1A illustrates a generalized example of a suitable computing environment 100 in which several of the described embodiments may be implemented. The computing environment (100) is not intended to suggest any limitation as to scope of use or functionality, as the techniques and tools described herein may be implemented in diverse general-purpose or special-purpose computing environments.

With reference to FIG. 1A, the computing environment 100 includes at least one CPU 110 and associated memory 120 as well as at least one GPU or other co-processing unit 115 and associated memory 125 used for video acceleration. In FIG. 1A, this most basic configuration 130 is included within a dashed line. The processing unit 110 executes computer-executable instructions and may be a real or a virtual processor. In a multi-processing system, multiple processing units execute computer-executable instructions to increase processing power. The memory 120, 125 may be volatile memory (e.g., registers, cache, RAM), non-volatile memory (e.g., ROM, EEPROM, flash memory, etc.), or some combination of the two. The memory 120, 125 stores software 180 for implementing a system with one or more of the described techniques and tools.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, memory cards, or any other medium which can be used to store information and which can be accessed within the computing environment 100. The storage 140 stores instructions for the software 180 implementing described techniques and tools.

The input device(s) 150 may be a touch input device such as a keyboard, mouse, pen, trackball or touchscreen, a voice input device, a scanning device, a digital camera, or another device that provides input to the computing environment 100. For video, the input device(s) 150 may be a video card, TV tuner card, or similar device that accepts video input in analog or digital form, or a CD-ROM or CD-RW that reads video samples into the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120, 125, storage 140, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "determine" to describe computer operations in a computing environment. These terms are high-level abstractions for operations performed by a computer, and should not be confused with acts performed by a human being. The actual computer operations corresponding to these terms vary depending on implementation.

II. Example Implementation Environment

FIG. 1B illustrates a generalized example of a suitable implementation environment 190 in which described embodiments, techniques, and technologies may be implemented.

In example environment 190, various types of services (e.g., computing services) are provided by a cloud 192. For example, the cloud 192 can comprise a collection of computing devices, which may be located centrally or distributed, that provide cloud-based services to various types of users and devices connected via a network such as the Internet.

In example environment 190, the cloud 192 provides services for connected devices with a variety of screen capabilities 194A-N. Connected device 194A represents a device with a mid-sized screen. For example, connected device 194A could be a personal computer such as desktop computer, laptop, notebook, netbook, or the like. Connected device 194B represents a device with a small-sized screen. For example, connected device 194B could be a mobile phone, smart phone, personal digital assistant, tablet computer, and the like. Connected device 194N represents a device with a large screen. For example, connected device 194N could be a television (e.g., a smart television) or another device connected to a television or projector screen (e.g., a set-top box or gaming console).

A variety of services can be provided by the cloud 192 through one or more service providers (not shown). For example, the cloud 192 can provide services related to HDR image generation and rendering to one or more of the various connected devices 194A-N. Cloud services can be customized to the screen size, display capability, or other functionality of the particular connected device (e.g., connected devices 194A-N). For example, cloud services can be customized for mobile devices by taking into account the screen size, input devices, and communication bandwidth limitations typically associated with mobile devices.

III. High Dynamic Range Imaging—Overview

Although the human visual system is capable of detecting details in a very wide dynamic range, especially in terms of brightness, humans do not normally pick up details across the full breadth of this dynamic range all at once. For example, it is difficult for humans to pick up details in very bright areas and very dark areas simultaneously. However, by focusing on various local areas in a scene, the human visual system can adapt very quickly to brightness in local areas in order to see details in bright areas (e.g. sky) as well as darker areas (e.g., shadows).

Many existing digital cameras (including most DSLR (digital single lens reflex) cameras) lack direct HDR image capture capabilities and are only capable of delivering each shot from one single perspective at a standard dynamic range. So, there is a large gap between the level of detail that humans can perceive and the level of detail that can be represented in SDR images. A viable solution to the problem is High-Dynamic-Range (HDR) imaging. An HDR image can capture rich information in a scene, and when rendered properly can deliver a very realistic visual experience. Due to the non-linearity and local-adaptive nature of the human visual system, most of the HDR imaging experience can be achieved with normal printouts or existing displays, making the market for HDR images potentially very large. HDR imaging technologies have therefore drawn more attention recently from users, including professional photographers and hobbyists.

A. Tone Mapping

One way to convert HDR image information to a lower dynamic range, such as for rendering an HDR image for an SDR display, is by applying a tone map to the HDR image information. A tone map refers to a function, g, which maps an image sample value s to a sample value g(s). Global tone mapping is the process of applying a global tone map to each of the sample values in a given image I. For example, a global tone map can be applied to an image to modify the brightness and/or contrast qualities of the image as desired by a user, resulting in a tone-mapped image G(I). Local tone mapping refers to a function L which transforms an image I to a tone-mapped image L(I). As with global tone mapping, a local tone map can be applied to an image with the goal of adjusting brightness and contrast in the image. However, a local tone map can allow for local adjustments which may not be uniformly applied across the image.

Tone mapping can be applied to images for different purposes. For example, tone-mapping can involve mapping sample values in an HDR image to a narrower dynamic range. One application of this kind of tone mapping is to render an HDR image for display on a monitor that it is not capable of displaying the full dynamic range of the HDR image. Another application of this kind of tone mapping is to prepare an HDR image for encoding in a format that requires a lower-bit-depth representation of the image.

B. Exemplary Image Formats

Digital images described herein can be color, grey-scale, or other types of images, and can be represented in a variety of file formats (e.g., GIF, PNG, BMP, TIFF, TIFF Float32, JP2, HDR, OpenEXR, JPEG XR, Radiance RGBE and/or other formats). This section provides details about some image formats that can be used with described techniques and tools for generating HDR images and rendering HDR images, and related user interface features. For example, described techniques and tools can handle HDR images in a JPEG XR format.

JPEG XR is a flexible and powerful format that is useful for encoding HDR images, supporting up to 32 bit floating point numbers. JPEG XR supports HDR image coding while requiring only integer operations (with no divides) for both compression and decompression. JPEG XR is compatible with a file container to store image data and metadata, which can include HD Photo metadata, XMP metadata, and Exif metadata through IFD tags. Compared to existing HDR formats, such as TIFF Float, OpenEXR, and Radiance RGBE, the JPEG XR format provides much higher compression capability while preserving reasonable image quality. The JPEG XR file format is extensible, so additional metadata (either proprietary or standard) can be inserted in JPEG XR files without changing image bit streams.

Radiance RGBE is another format for carrying HDR image data. In an RGBE image, each pixel is represented by 32 bits: one group of bits (e.g., one byte) for a red mantissa (R), one group of bits (e.g., one byte) for a green mantissa (G), one group of bits (e.g., one byte) for a blue mantissa (B), and the remaining bits (e.g., one byte) for a common exponent (E) that is applied to the values represented by the mantissa for each of the R, G and B channels. In RGBE, effective pixel values (fR, fG, fB) are floating point numbers, where $fR=R*2^{(E-128)}$; $fG=G*2^{(E-128)}$; and $fB=B*2^{(E-128)}$. An RGBE rule restricts the largest 8-bit mantissa within the range [128, 255], while the other two 8-bit mantissas are unrestricted (i.e., the range is [0, 255]). So, the mapping from RGB to RGBE is unique. The dynamic range that RGBE can present is $[2^{-127}, 2^{+127}]$, which is approximately 76 orders of magnitude. The RGB value reconstructed from an RGBE pixel is unsigned—all nonzero values are positive. However, since the three color components share the same exponent, the precision of the two smaller components is sacrificed. E=0 is a special case, indicating that the corresponding pixel value is zero.

One variant of Radiance RGBE (9:9:9:5) assigns 9 bits each to the red, green and blue mantissa channels, and 5 bits to the exponent, thus representing each pixel in 32 bits as in the 8:8:8:8 format described above. Other representations of RGBE also are possible, with different numbers of bits assigned to the mantissas and the exponent.

32-bit floating point ("32-bit float") is commonly used in representing floating point image data. Container formats defining 32-hit floating point images include Portable Float Map ("PFM") and Tagged Image File Format ("TIFF"). The IEEE 754 32-bit single-precision float number includes 1 bit for the sign (s), 8 bits for the exponent (e) and 23 bits for the mantissa (m). 16-bit floats (also referred to as "half") have one sign bit, five exponent bits and ten mantissa bits. Since the 16-bit and 32-bit floating point representations are structurally identical except for specific differences in lengths of fields, they can be referred to generically as "floating point."

Some image formats are specified by international standards. For example, the JPEG and JPEG2000 standards set forth requirements for decoders to decode images encoded in JPEG and PEG-2000 format, respectively. A JPEG2000-compliant encoder and decoder ("codec") provides high-quality images with good compression efficiency. The JPEG XR standard was developed from Windows Media Photo and HD Photo, proprietary image compression formats developed by Microsoft Corporation as part of the Windows Media family of technologies. JPEG XR is described in international standard ISO/IEC 29199-2:2009.

IV. Techniques and Tools for High Dynamic Range Image Generation and Rendering

Described embodiments include techniques and tools for generating HDR images (e.g., an algorithm to generate an HDR image from a set of SDR images with various exposure levels), techniques and tools for rendering HDR images (e.g., an algorithm to render an HDR image to an SDR image or display), and techniques and tools for setting control parameters for HDR image processing (e.g., tools to facilitate HDR image coding with rendering parameters embedded as control parameters).

Figure 2:
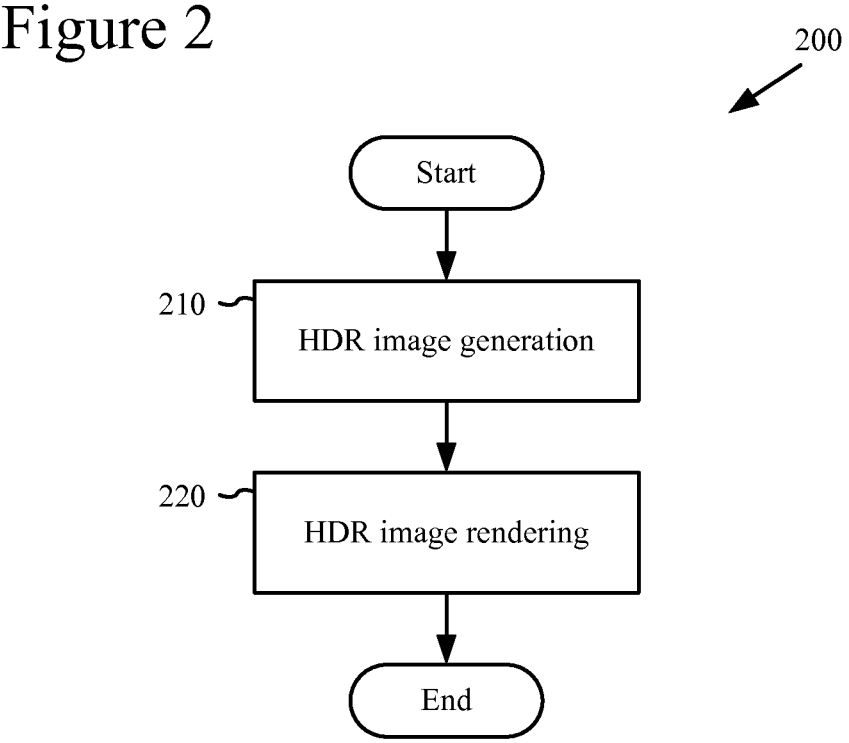
FIG. 2 is a diagram showing an exemplary digital HDR imaging workflow including HDR image generation and HDR image rendering, according to one or more described embodiments.

As shown in FIG. 2, an exemplary digital HDR imaging workflow 200 includes HDR image generation 210 and HDR image rendering 220. In HDR image generation 210, an HDR image is generated. For example, an HDR image can be generated by synthesizing information from multiple SDR images (e.g., images of the same scene taken at slightly different time instances, each with a different exposure setting). It is also possible to generate HDR images directly without combining multiple images, such as by capturing an image with an image capture device that is capable of capturing original images with HDR bit depth. HDR image generation 210 can include preprocessing (e.g., manual or automatic operations) to remove undesirable image artifacts (e.g., artifacts introduced when compressing source images that will be used to form an HDR image).

In HDR image rendering 220, HDR image information is converted into another form. For example, an HDR image can be rendered as an SDR image (e.g., a PEG image) and displayed on an SDR display. Image rendering can involve a tone mapping process (e.g., an automatic or semi-automatic tone mapping process). Rendered images can be published or archived. However, image data is typically lost when converting HDR images to SDR images. Therefore, it can be useful to archive an original version of the HDR image (e.g., to perform further modifications on the original image at a later stage). It is also possible to render HDR images without remapping to a standard dynamic range, such as when a display is capable of rendering the full dynamic range of an HDR image without remapping.

Although the exemplary workflow 200 shows HDR image generation 210 followed by HDR image rendering 220, an HDR image processing system can generate HDR images without rendering them, such as when HDR images are generated for storage or for further processing, but are not displayed. An HDR image processing system also can render HDR images rendering without generating them, such as when an HDR image processing system obtains HDR image information (e.g., via a communication medium) from some other source without first generating the HDR image.

In examples described herein, SDR images are images with 8 bits per color channel (bpc), and HDR images are 16 bpc images, or more. More generally, "standard dynamic range" or SDR refers to a display, image, format, etc., with a narrower or lower dynamic range than an HDR image. (SDR images also can be referred to as lower dynamic range, or LDR images.) Similarly, "high dynamic range" or HDR refers to a display, image, format, etc., with a wider or higher dynamic range than an SDR image. For example, described embodiments can be used to generate 32 bpc HDR images from 16 bpc SDR images, or for rendering 32 bpc HDR images for display on a 16 bpc monitor.

In general, digital images described herein can be captured by or stored on any device capable of capturing digital images (e.g., digital still image cameras, digital video cameras, scanners, or multipurpose devices with image capture capability such as camera phones) or any medium capable of storing digital images (e.g., volatile memory or nonvolatile memory such as optical disks or flash memory).

A. Generalized HDR Imaging System

Figure 3:
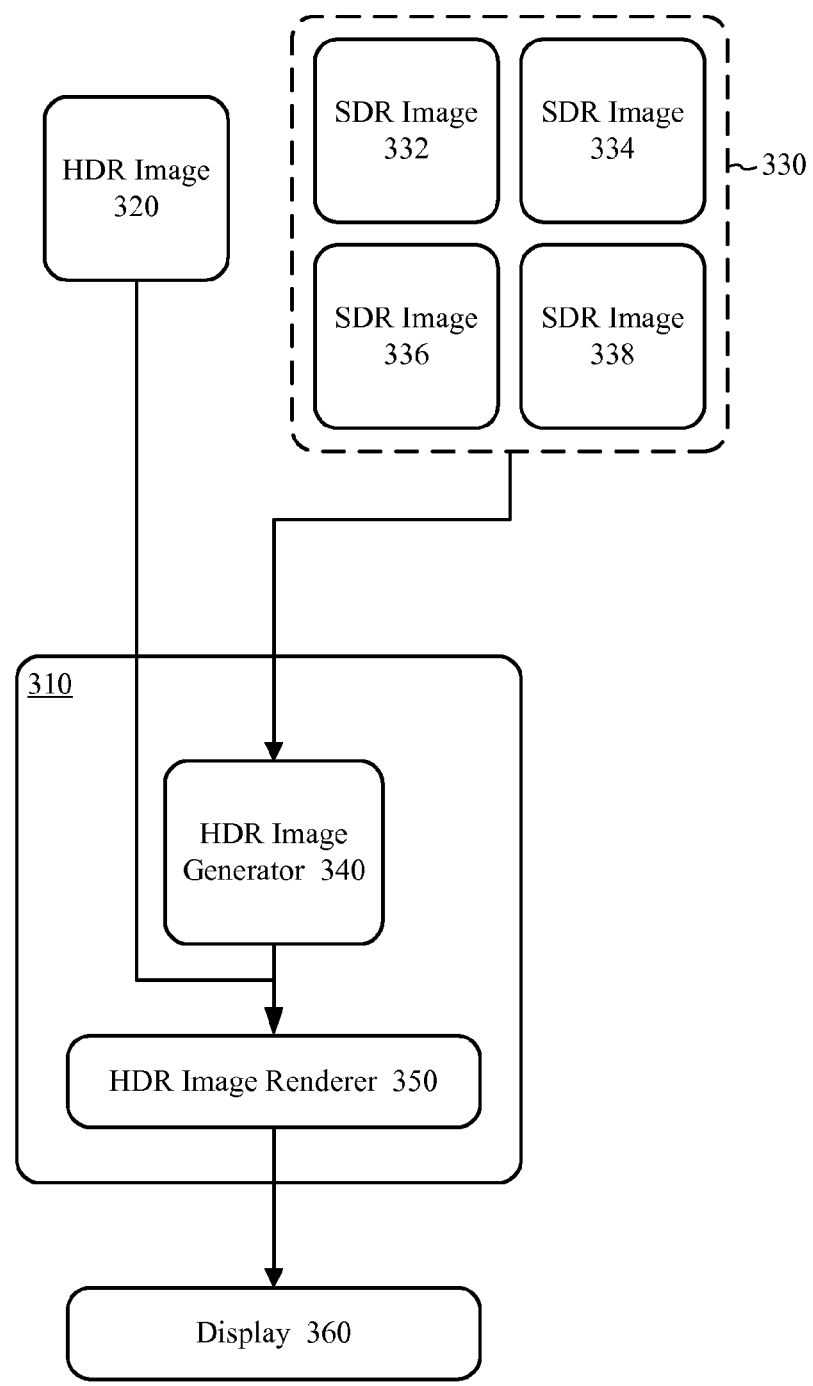
FIG. 3 is a diagram illustrating a generalized HDR image processing system according to one or more described embodiments.

FIG. 3 is a diagram illustrating a generalized HDR image processing system 310. FIG. 3 shows different kinds of image input that the system 310 can accept. For example, FIG. 3 shows HDR image 320 and a set 330 of SDR images 332, 334, 336 and 338 having lower dynamic ranges (e.g., smaller exposure ranges) than HDR image 320. In general, the image input to the system 310 can be a single image, a set of images (e.g., a set of images having varying dynamic ranges used to construct an HDR image, or a set of several HDR images), and/or other information such as metadata or user preference data (not shown) relating to the images. Metadata can include, for example, information indicating camera settings. User preference data can include, for example, user-controlled parameter settings for viewing or modifying images. Metadata and user preference data can be contained within image files or provided separately. Although only one HDR image is shown in FIG. 3, the system 310 can accept more than one HDR image as input.

FIG. 3 shows an HDR image generator 340 operable to generate HDR images and an HDR image renderer 350 operable to render HDR images for display. Although the system 310 shows HDR image generator 340 and an HDR image renderer 350, the system 310 can perform HDR image generation without rendering, such as when HDR images are generated for storage or for further processing, hut are not displayed. The system 310 also can perform HDR image rendering without HDR image generation, such as when an HDR image processing system obtains HDR image information (e.g., via a communication medium) from some other source without first generating the HDR image.

In the example shown in FIG. 3, HDR image generator 340 synthesizes information from the SDR image set 330 (e.g., images of the same scene taken at slightly different time instances, each with a different exposure setting). HDR image renderer 350 can then map a generated HDR image to an SDR image and prepare the SDR image for output on display 360. It is also possible to render HDR images without remapping to a standard dynamic range, such as when a display is capable of displaying an HDR image in its full dynamic range without remapping.

The relationships shown between modules within the system 310 indicate general flows of information in the system; other relationships are not shown for the sake of simplicity. Particular embodiments typically use a variation or supplemented version of the generalized system 310. Depending on implementation and the type of processing desired, modules of the system can be added, omitted, split into multiple modules, combined with other modules, and/or replaced with like modules. In alternative embodiments, systems with different modules and/or other configurations of modules perform one or more of the described techniques.

For example, the system 310 can include a pre-processor that smoothes input digital images using a lowpass filter or other filter so as to selectively remove high-frequency components. Or, the pre-processor performs other pre-processing tasks. The system 310 can also include one or more encoders that compress image data, outputting a bit stream of compressed digital image information. The exact operations performed by the encoder can vary depending on compression format. For example, an encoder can compress the HDR image information according to an HDR image format such as JPEG XR, or an encoder can compress SDR image information according to a format such as JPEG. The system 310 also can include one or more decoders that decompress compressed image data, outputting a bit stream of decompressed digital image information. The exact operations performed by the decoder can vary depending on compression format. For example, a JPEG XR-compliant decoder can decompress HDR image information in a JPEG XR file, or a JPEG-compliant decoder can decompress SDR image information in a JPEG file.

B. Approaches for High Dynamic Range Image Generation

1. Generalized Technique

Figure 4:
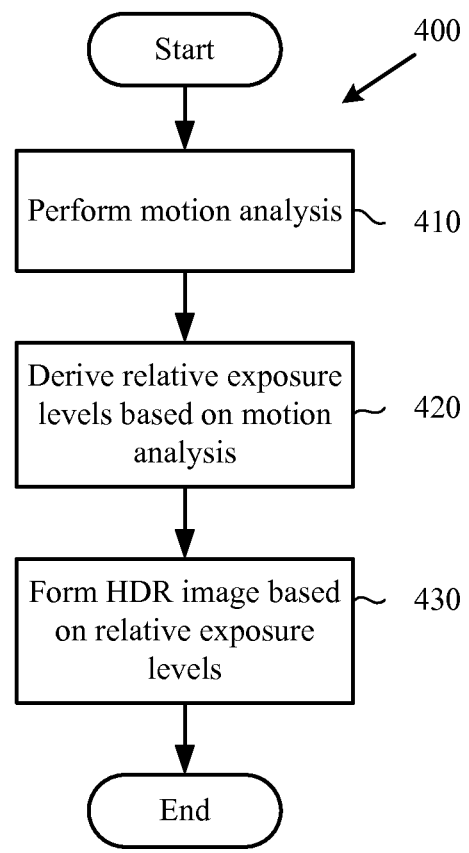
FIG. 4 is a flow chart showing an example technique for generating an HDR image from a set of SDR images, according to one or more described embodiments.

FIG. 4 shows a technique 400 for generating an HDR image from a set of SDR images, in which relative exposures are derived for the SDR images based on motion analysis. A system such as the HDR image processing system 310 shown in FIG. 3 or other system performs the technique 400.

At 410, the system performs motion analysis relative to a reference image in a set of images depicting a scene. The motion analysis comprises determining image differences for each of the non-reference images in the set, relative to the reference image. In one implementation, the system selects the reference image from a set of candidate images by determining which of the images in the set has the most sample values that fall within an acceptable exposure range, and designating that image as the reference image. Alternatively, the reference image is designated as a reference image in some other way.

At 420, the system derives exposure levels relative to the reference image based at least in part on the motion analysis. For example, the system derives relative exposure levels for each non-reference image based on motion analysis information for the non-reference images.

At 430, the system integrates the set of plural digital images to form an HDR digital image depicting the scene. The integration is based at least in part on the relative exposure levels. For example, where relative exposure levels have been derived for each non-reference image, the system uses these relative exposure levels to calculate sample values the HDR digital image.

2. Example Implementations

This section provides implementation details for example implementations of a group of approaches to generating an HDR image from a set of SDR images.

Figure 5:
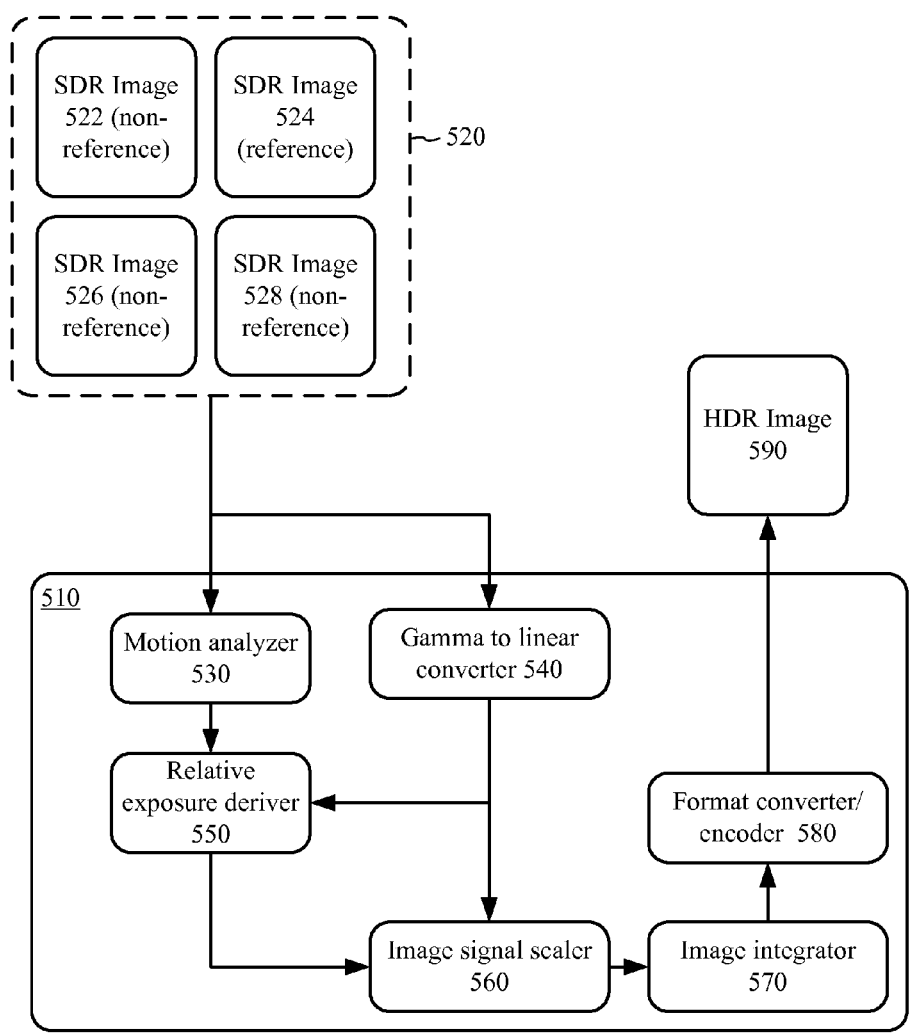
FIG. 5 is a diagram showing an example implementation of an HDR image generation system, according to one or more described embodiments.

An example implementation for a HDR image generation system 510 is shown in FIG. 5. In this example, HDR image generation system 510 takes as input SDR image information 520, which comprises image information for a set of SDR images 522, 524, 526, 528, which are images of a scene with one or more different settings that will produce a higher dynamic range image 590 when the images are processed and integrated. For example, SDR images 522, 524, 526, 528, are images of a scene taken at different time instances with different exposure settings. FIG. 5 shows example modules that implement various processing stages and produce as output an HDR image 590.

a. Motion Analysis

Motion analyzer 530 analyzes motion in the input SDR images 522, 524, 526, 528. For example, where SDR images 522, 524, 526, 528 represent the visual state of a scene at different time instances, motion analyzer 530 analyzes motion that occurs in the sequence of images. When images of a scene are taken at different time instances, there is very likely to be image motion (either global or local) between the different shots of a scene. The motion analyzer 530 can align image textures across various shots and quantify movement so that such movement can be considered when performing further processing.

Motion analyzer 530 performs motion analysis relative to a reference image. In the example shown in FIG. 5, image 524 is designated as a reference image. A reference image is typically an image with a middle exposure range (i.e., an exposure range that is not the brightest or the darkest in a set of input images). In one implementation, the reference image is selected based on which image in a set of input images has the most sample values within a "normal" range—i.e., a range that is not too high (saturated) or too low (underexposed). The limits of the normal exposure range, and the way in which the normal range is determined, can vary. For example, a normal exposure range can be predetermined for all images, or determined adaptively for each image or input image set (e.g., based on image information and/or user preferences). Selection of a reference image can be performed automatically by the motion analyzer 530 (e.g., based on image information and/or user preference information), or an image can be designated as a reference image before the image is provided to the motion analyzer 530.

Motion analyzer 530 uses image differences to model motion in the input images 522, 524, 526, 528. Although various techniques have been developed for measuring differences in video pictures (e.g., mean square difference, sum of squared differences) to analyze motion in video, example implementations use a different measure for analyzing motion in still images than would be used in typical video applications because of the desirability of accounting for exposure differences in the different shots. In one implementation, the motion analyzer 530 measures image differences by calculating differences in sample values with a "normalized cross correlation" metric. For example, the normalized cross correlation of one image, t (x, y), with another image, f (x, y) is:

$$\frac{1}{n-1} \sum_{x,y} \frac{(f(x, y) - \bar{f})(t(x, y) - \bar{t})}{\sigma_f \cdot \sigma_t}, \quad (1)$$

where n is the number of pixels in t (x, y) and f (x, y), and represents the standard deviation. Alternatively, the measure of image differences can be performed in another way, such as by eliminating the subtraction of the mean sample values ($\bar{f}$ and $\bar{t}$) in each picture.

Put another way, define two images (or image regions) as i1(x, y) and i2(x', y'), with (x, y) and (x', y') as the 2 D coordinates of the respective samples. The difference ("diff")

between the two images or image regions (assuming same resolution and size) can be represented as $$diff = corr = \frac{\langle (i1 - \langle i1 \rangle) * (i2 - \langle i2 \rangle) \rangle}{(sd(i1) * sd(i2))}, \quad (2)$$

where <i> represents the mean sample value of the respective image or image region "i" and sd(i) represents the standard deviation (sqrt(<(i−<i>)²>) of the respective data set. "corr" is an invariant in case the data are scaled by a constant, such as a scaling factor to adjust exposure levels, i.e., $$\frac{\langle (S*i1 - \langle S*i1 \rangle) * (i2 - \langle i2 \rangle) \rangle}{(sd(S*i1)*sd(i2))} = \frac{\langle (i1 - \langle i1 \rangle) * (i2 - \langle i2 \rangle) \rangle}{(sd(i1)*sd(i2))}, \quad (3)$$

where S is a constant that represents a scaling factor. This can be a useful measurement to measure differences between images with different exposure levels, where the difference in exposure levels can be represented as a constant that represents a scaling factor. For color images (e.g., RGB images) the image difference can be an average of the "con" for each of the color channels or a weighted average of the channels (e.g., with a weighting factor of ¼, ½, and ¼, respectively for the R, G, and B channels).

Alternatively, the measure of image differences can be performed in another way, such as by using an equation that omits subtraction of mean sample values (e.g., Ī and ī in Equation (1), above). As another alternative, other metrics, such as normalized correlation coefficient, can be applied in motion analysis.

Motion analyzer 530 searches for matches between pixel locations in reference images and pixel locations in non-reference images. In one implementation, a normalized cross correlation metric is used to analyze sample values and determine whether a match is present. Details of motion analysis, such as criteria for what constitutes a match and search patterns that are used for detecting matches, can vary depending on implementation. For example, motion analyzer 530 can search for matches at nearby pixel locations, then gradually expand the search area (such as in an expanding spiral pattern) to match a pixel in a non-reference image with a pixel in a reference image.

Global motion analysis refers to analysis that aims to model motion such as panning, shudder, rotation, zoom, or other movements that affect the entire image. Global motion analysis can involve looking for matching sample values in pixel locations that are consistent with particular kinds of global motion. For example, looking for panning motion in a non-reference image can involve searching for matching sample values in a predominantly horizontal direction in a reference image. Local motion analysis refers to analysis that aims to model movement in individual parts of the image, such as movement of objects or human subjects.

After detecting motion from a particular pixel location to another, the motion analyzer 530 quantifies the motion. In one implementation, the motion analyzer 530 calculates a motion vector for each pixel in an image, relative to a reference image. For example, a motion vector can indicate a displacement in the horizontal dimension and a displacement in the vertical dimension, relative to a reference image. A motion vector of zero can be used to indicate that no motion has been detected for a particular pixel. Alternatively, the motion analyzer 530 quantifies motion in some other way. For example, the motion analyzer 530 can subsample the input images and calculate motion vectors for pixels in the subsampled images.

In example implementations, unusually low sample values or unusually high sample values are not considered in the motion analysis because they are often not reliable; for example, the high or low value of the sample may be due to image noise, or the value may not be an accurate measurement due to dynamic range limitations of an image sensor in the image capture device. The range of acceptable sample values for use in motion analysis, and the way in which the range is determined, can vary. For example, a range of acceptable sample values for use in motion analysis can be predetermined for all images, or determined adaptively for each image or input image set (e.g., based on image information and/or user preferences).

The particular techniques used to perform global and local analysis can vary depending on implementation, and techniques used for global motion analysis may differ from techniques used for local motion analysis.

b. Gamma-to-Linear Conversion

The gamma-to-linear converter 540 can be used to convert input image signals that are not in a linear domain. Data in still image files (e.g., PEG files) typically include gamma-encoded values. In one implementation, all R/G/B samples are converted to the linear domain according to a color profile carried in each image or a default color profile in the HDR image generation system 510. This allows gamma-encoded sample values to be converted to the linear domain, where the sample values can be scaled (as described in more detail below), before integrating the image data into an HDR image. Alternatively, such as where gamma-to-linear conversion is not needed, the gamma-to-linear converter 540 can be omitted.

c. Derivation of Relative Exposure Levels

The relative exposure deriver 550 derives relative exposures for the input SDR images 522, 524, 526, 528 based on the motion analysis. In this way, the relative exposure level of each image can be derived against the reference image, while taking motion into account. For example, for a pixel in a non-reference image having a sample value, a motion vector indicates motion relative to the reference image. The motion vector points to a corresponding pixel in the reference image with its own sample value. The ratio of the pair of sample values is the sample ratio. In this way, a sample ratio can be derived for each pair of the sample values based on motion analysis. A relative exposure can then be calculated by finding the average of the sample ratios. In one implementation, the relative exposures are derived based on data in the linear RGB domain provided by gamma-to-linear converter 540. Alternatively, the exposure deriver 550 calculates a relative exposure level in some other way.

d. Image Signal Scaling

The image signal scaler 560 scales sample values based on the relative exposure level. In one implementation, the image signal scaler 560 multiplies sample values for each non-reference input SDR image 522, 526, 528 by a scaling factor that corresponds to the relative exposure level for the respective image, but omits scaling for the reference image 524. The scaling takes the scaled sample values to the same (reference) normalization level. In one implementation, the scaling operations are applied to linear RGB data provided by gamma-to-linear converter 540, with the same scaling factor applied across all R, G and B sample values of the image. Alternatively, scaling is performed before motion analysis, and motion analysis can be performed on the scaled pictures.

However, in this case, motion analysis may be less reliable because the motion analysis is being performed on scaled sample values.

e. Image Integration

The image integrator 570 integrates the input SDR images 522, 524, 526, 528. When the HDR image generation system 510 has taken as input several SDR images depicting a scene, there are multiple sample values for each sample position in the scene. The image integrator 570 integrates the sample values to form a sample value for the corresponding sample position in the HDR image.

In one implementation, the image integrator 570 calculates a weighted average of sample values, including scaled sample values for each sample position—linear signals scaled to the same "reference" exposure level are integrated as a weighted average. The weighting factor for each sample value is based on a confidence level that is determined according to the corresponding original sample value before scaling and linear conversion. The weighting factor is proportional to the confidence level; the higher the confidence level, the higher the weighting factor. The confidence level varies depending on how extreme the original value is. For example, the confidence level is set to 0 for extremely dark or saturated areas.

One example of how the confidence level C(s) can be calculated for cases where the original value is in the gamma domain (instead of the linear domain) is shown below.

$$C(s) = \begin{cases} (0.95 - s)/0.2 & 0.75 < s < 0.95 \\ (s - 0.05)/0.7 & 0.05 < s \le 0.75 \\ 0 & \text{otherwise.} \end{cases} \quad (4)$$

Equation (4) indicates that a confidence level of zero applies to values that are too high or too low. Alternatively, confidence level is calculated in some other way. For example, the threshold of range of values that will be assigned a confidence level of zero can vary depending on implementation.

In one implementation, weighting factors are also a function of exposure levels. In calculating the weighted average, sample values from higher-exposure shots are weighted more than sample values from images with lower exposures. This is based on the observation that, statistically, sample values tend to be more accurate when the number of photons getting into the image sensor is greater.

As an example, the weighting factor w for a sample with original value "s" (with s normalized in the range of [0, 1]) can be represented as $$w(s,e) = C(s) * e^a \quad (5),$$

where "e" is a relative exposure value (such as a relative exposure value calculated by relative exposure deriver 550) and C(s) is the confidence level. The typical value of the power factor "a" is between 0.25 and 1.0. In one implementation the power factor "a" is set to be 0.5 (i.e., the square root of e).

When the weighting factors have been determined, the weighted average can be derived. For example, the weighted average can be calculated as a weighted arithmetic mean or a weighted geometric mean.

f. Format Conversion

The format converter/encoder 580 converts an integrated image to an appropriate pixel format. For example, the format converter/encoder 580 takes integrated pixel data provided by the image integrator 570 and encodes the data to create a JPEG XR image file. Alternatively, the format converter/encoder 580 processes the data to create a different image file, such as an RGBE file, a "half float" file, or another file suitable for representing HDR image data. The format converter/encoder 580 can include encoding modules for any desired image format. The format converter/encoder 580 can be omitted from the HDR image generation system 510, such as when raw HDR pixel data is the desired output, and no special formatting or encoding is necessary.

g. Extensions and Alternatives

The relationships shown between modules within the system 510 indicate general flows of information in the system; other relationships are not shown for the sake of simplicity. Depending on implementation and the type of processing desired, modules of the system can be added, omitted, split into multiple modules, combined with other modules, and/or replaced with like modules. In alternative embodiments, systems with different modules and/or other configurations of modules perform one or more of the described techniques.

For example, the system 510 can include a pre-processor that smoothes input digital images using a lowpass filter or other filter so as to selectively remove high-frequency components. Or, the pre-processor performs other pre-processing tasks. For example, the pre-processor can perform tasks specific to reducing image artifacts, such as block artifacts, banding artifacts, ringing artifacts, or artifacts resulting from demosaicing operations in an image capture device.

B. Approaches for High Dynamic Range Image Rendering

1. Generalized Technique

Figure 6:
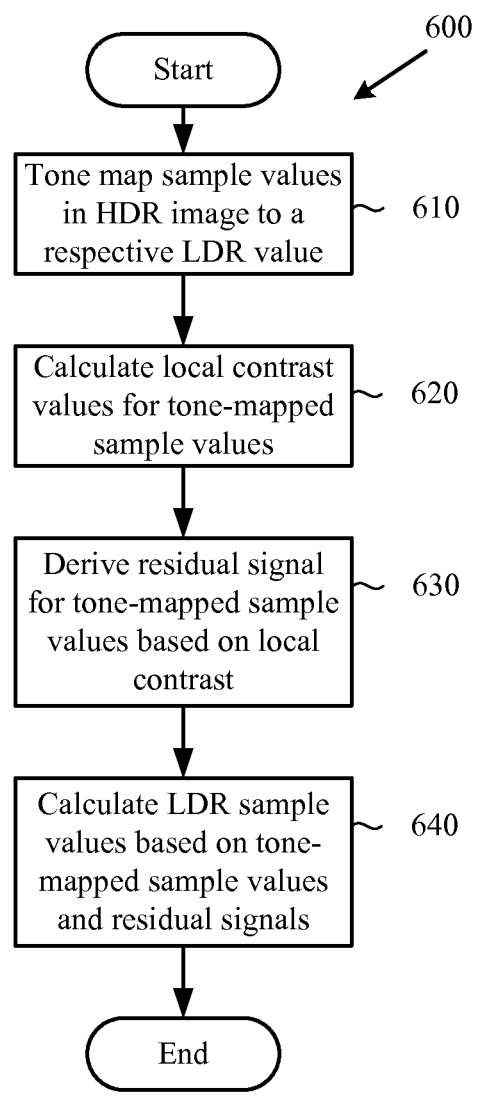
FIG. 6 is a flow chart showing an example technique for rendering an HDR image, according to one or more described embodiments.

FIG. 6 is a flow chart showing an example technique 600 for rendering an HDR image. A system such as the HDR image processing system 310 shown in FIG. 3 or other system performs the technique 600. As used herein, the term "rendering" refers to converting HDR image data to a different form. Examples of applications for rendering HDR image data include preparing an HDR image for display on a monitor having a lower dynamic range, or converting HDR image data in an HDR image file for storage in an SDR image file.

In the example technique 600, at 610 the system tone maps sample values in an HDR digital image to a respective lower dynamic range (LDR) value. For example, the system identifies the respective LDR value in a global tone mapping lookup table and stores the identified values in an LDR image buffer.

At 620, the system calculates a local contrast value for each of the tone-mapped sample values. For example, the system calculates a local contrast value based image data in the linear domain.

At 630, the system derives a residual signal for each of the tone-mapped sample values, based at least in part on the respective local contrast value. For example, the system multiplies a sample value in the LDR image buffer by the corresponding local contrast value.

At 640, the system calculates sample values for an LDR digital image based at least in part on the tone-mapped sample values and the respective residual signals. For example, the system adds together a sample value in the LDR buffer, the corresponding residual signal and a high-frequency dithering signal.

2. Example Implementations

This section provides implementation details for example implementations of a group of approaches to rendering HDR images.

Figure 7:
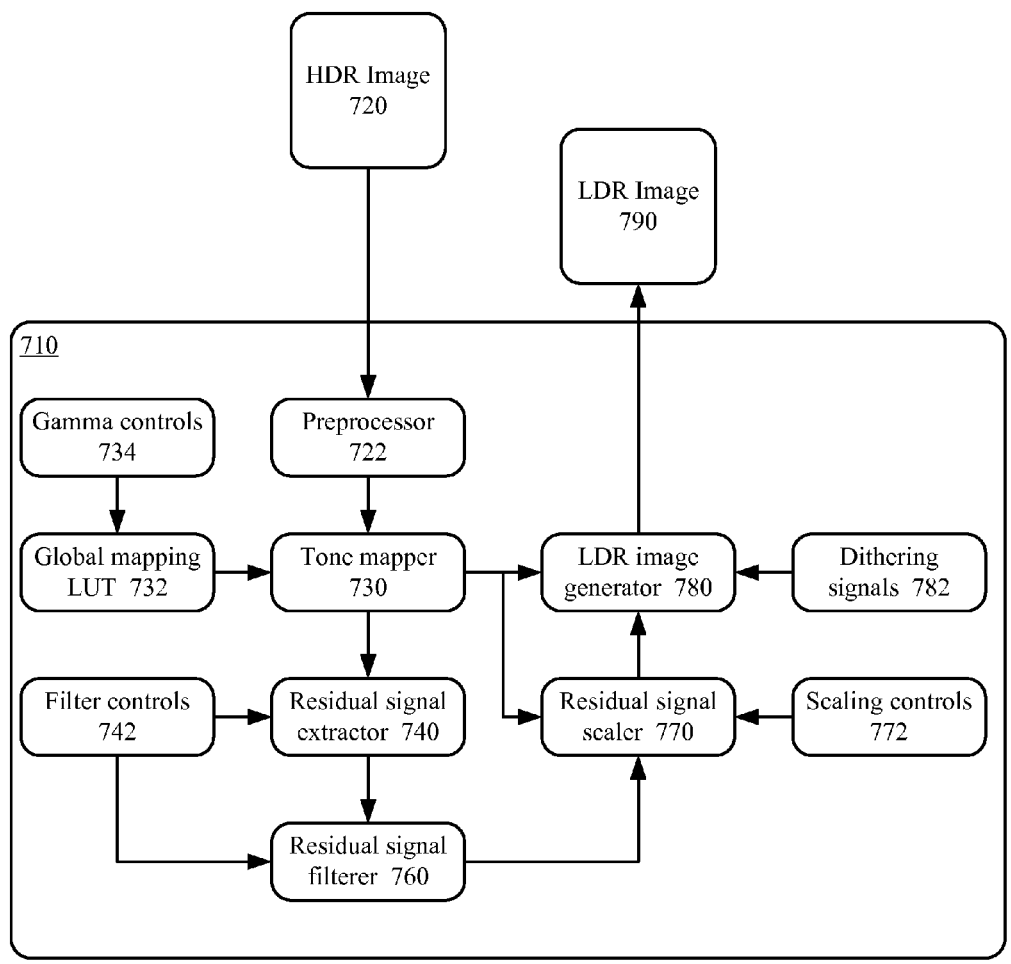
FIG. 7 is a diagram showing an example implementation of an HDR image rendering system, according to one or more described embodiments.

FIG. 7 is a diagram showing an example implementation of an HDR image rendering system 710. In the example shown in FIG. 7, system 710 takes as input HDR image 720. FIG. 7 shows example modules that implement various processing stages and produce as output an HDR image 790. In particular, the system 710 shows modules for implementing HDR rendering with bilateral image processing. "Bilateral image processing" as used herein refers to HDR image processing that uses both original HDR image information and tone-mapped, lower dynamic range information. For example, the system 710 uses both original HDR image information and tone-mapped image information to perform local image contrast calculations during HDR image rendering.

a. Preprocessing

In the example shown in FIG. 7, system 710 includes preprocessor 722. Preprocessor 722 performs digital signal processing (DSP) operations in a preprocessing stage on HDR image data from HDR image 720. Operations that can be performed in the preprocessor 722 include, but are not limited to, image resizing, explicit exposure or dynamic range control, color temperature control, and color enhancement. Preprocessing operations can be performed in order to achieve various effects on image quality. For example, color enhancement can be used to provide a more artistic look to a rendered picture. Preprocessing operations can be performed in different ways, depending on implementation. For example, color enhancement can be achieved by boosting saturation in the hue-saturation-intensity (HIS) space, or as a simpler alternative, a dominant color channel (e.g., R, G or B in an RGB color space) for each pixel can be boosted. Preprocessing operations can be adjusted or turned on or off based on user preference.

Operations described with reference to preprocessor 722 are not limited to being formed in a preprocessing stage, and can instead be performed on a rendered LDR image (e.g., LDR image 790). However, performing such operations in a preprocessing stage on HDR image data can produce more accurate results, since some image data is typically lost when mapping HDR image data to a lower dynamic range.

b. Tone Mapping

In the example shown in FIG. 7, system 710 includes tone mapper 730. In one implementation, for each sample in a linear domain, tone mapper 730 identifies a corresponding LDR value using LUT 732, and stores the corresponding value in an LDR image buffer. In a tone mapping process from a linear domain to a gamma-corrected domain, a linear sample value x is converted to a gamma-corrected value x', typically following the equation $x'=x^{gamma}$, where the control parameter "gamma" is a constant in practice. Once the LUT 732 has been generated, tone mapper 730 looks up HDR image sample values in LUT 732 to determine LDR sample values. This process of identifying corresponding LDR values for sample values in an HDR image and storing them in the LDR image buffer can be referred to as first-pass tone mapping. If applied to all parts of an HDR image, this process can be referred to as first-pass global tone mapping.

LUT 732 can be generated based on an adaptive gamma function. The adaptive gamma function generates an adaptive gamma parameter for generating the LUT 732. When gamma is a function of a linear sample value x (an adaptive gamma function), this situation can be generally represented as $x'=x^{gamma(x)}$. In one implementation, the adaptive gamma parameter $\gamma(x)$ for a sample value x in the gamma domain is a weighted average of two control parameters $\gamma_0$ and $\gamma_1$, as shown below in Equation (6).

$$\gamma(x)=(1-w(x))\cdot\gamma_0+w(x)\cdot\gamma_1, x\in[0,1] \quad (6).$$

In a simplified case, $\gamma_0$ can be set to 2.2. Gamma control parameters can be specified in information obtained from gamma controls 734, which can be used to obtain user preference information relating to gamma parameters. Alternatively, gamma controls 734 are omitted.

The weighting function w(x) can be implemented in different ways. As an example, the function w(x) can be represented as $w(x)=\sqrt{x}$, or, to provide more flexibility, the function w(x) can be represented as $w(x)=x^b$, with "b" in a range of [0.2, 1.0]. Alternatively, b is limited to a different range, or the weighting function w(x) is implemented in some other way.

In first-pass tone mapping (e.g., first-pass global tone mapping), the image contrast in relatively bright regions can be significantly reduced. However, other modules in the system 710 can be used to bring the image contrast back to normal, or even to an enhanced level in terms of visual quality.

c. Residual Signal Extraction and Related Filtering

In the example shown in FIG. 7, system 710 includes residual signal extractor 740. Residual signal extractor 740 calculates local image contrast. In one implementation, residual signal extractor 740 calculates local image contrast using a low-pass filter for each sample based on data in a linear domain, and data obtained in first-pass tone mapping are used to set a threshold T for the filtering, so strong texture will not be further enhanced. The threshold T also can be a user-controlled parameter (e.g., based on user preference information obtained from optional filter controls 742).

Residual signal extractor 740 uses bilateral image processing to calculate local image contrast. For example, the threshold T is based on first-pass global tone mapping results, while the filter operation is performed in an HDR data space. In the HDR space, the output of the filter establishes a "background." The relative delta between the original sample value and the "background" is the local contrast value, as shown in Equation (7):

$$\text{Local contrast}=(\text{original}-\text{background})/\text{background} \quad (7).$$

The residual signal for each sample is then derived by multiplying the local contrast value by the corresponding sample value in the LDR buffer.

In the filtering stage of residual signal extraction, the system 710 filters a current sample of the image. For example, the system uses an adaptive threshold filter along each of one or more lines of samples that include the current sample. Or, the system uses a corresponding two-dimensional filter. The strength of the filtering (e.g., as set according to a threshold value) can vary depending on first-pass tone mapping results, depending on user settings (e.g., user preference information obtained from optional filter controls 742), and/or depending on other factors. Alternatively, the system uses another filter.

In one embodiment, for a current sample value s(x, y) at location (x, y) in an input image, the filtering can be represented as follows:

$$s'(x, y) = \frac{1}{N}\left(\sum_{i,j\in(-K,K)} w(i, j)\cdot s(x+i, y+j)\right). \quad (8)$$

In this equation, w(i, j) represents a 2D lowpass filter that has a normalization factor of N, and K represents the filter range. Thus, s'(x, y) represents the filtered sample value.

Figure 8:
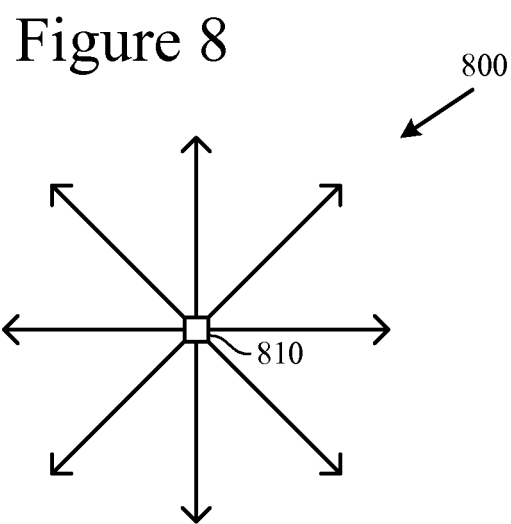
FIG. 8 is a diagram showing axes including a current sample location for filtering operations, according to one or more described embodiments.

The 2D filter can be implemented as a 2D window or as a combination of 1D filters along one or more axes. FIG. 8 shows axes along four directions: horizontal, vertical, top left to bottom right, and bottom left to top right, each including the current sample location 810. Sample values at locations that do not fall on one of these axes are given no weight (w(i, j)=0). Sample values at locations that do fall on one of these axes are given full weight (w(i, j)=1) and count towards the normalization factor. Alternatively, the filter uses another shape.

The size value K indicates the possible extent of filtering using the filter. In one implementation, K=8, and sample locations from −8 to +8 horizontally and vertically relative to the current location (x, y) are potentially considered. The idea is to use only sample values close to the sample 810 at the center point during the low-pass filtering process.

In some implementations, within the window, the filter uses a threshold to exclude certain locations. Without loss of generality, the following rule shows how a threshold adaptively changes which sample locations contribute to filtering in a 1D horizontal window. The location offset m represents an extent of similar values within the 1D window, moving away from the current location (x, y). For example, the offset m is set to be the minimum absolute value of i that satisfies the following constraint;

$$|t(x+i,y)-t(x,y)|>T \quad (9),$$

for −K<i<K, where t(x, y) represents values in the LDR buffer. If no value of i satisfies the constraint, then m=K. The adaptive filter is symmetric for the sake of simplicity; the same offset m is used in each direction. Alternatively, different offset values are used in different directions away from the current location. The threshold value T is a filter threshold control parameter. Sample values at locations within the offset m relative to the current location (x, y) are given weight in filtering, and other sample values in the 1D window are not.

$$w(i, j) = \begin{cases} 1 & |i| < m \\ 0 & \text{otherwise,} \end{cases} \quad (10)$$

where j=0 for filtering in the 1D horizontal window, and −K<i<K.

Consider the sequence of sample values 67, 67, 67, 68, 68, 69, 69, 70, 71, 72, 73, 73, 74, 75, 76 in a 1D horizontal window, where the current sample value t(x, y)=70. If the T=3, the offset value m=5 since at offset +5|74−70|>3.

Similarly, for the adaptive threshold rule along a 1D vertical window, j varies from −K<j<K when a location offset in is found. For the adaptive threshold rule along a diagonal 1D window, both i and j can vary, where i=j (for one diagonal shown in FIG. 8) or i=−j (for the other diagonal shown in FIG. 8), within the limits of −K and K to find location offset m. For a 2D window, Euclidean distance to locations at different values of i and j, within the limits of −K and K, can be considered to find the location offset m.

Whether or not adaptive threshold rules are applied, when the values of w(i, j) are set, the normalization factor N is determined. In some implementations, the tap coefficients of w(i, j) are either 0 or 1 for the sake of simplicity. The normalization factor N is simply the count of locations where w(i, j)=1. More generally, different locations in w(i, j) can have different tap values, for example, to provide more weight at the current location, or to implement a bilinear or bicubic filter, in which case the tap values for locations contributing to filtering are summed to determine the normalization factor N.

The strength of the filtering can effectively be controlled by setting the parameter values T and K. Increasing K increases the possible window size for filtering, which potentially results in stronger filtering. Increasing T tends to cause more locations to contribute to filtering, as more sample values satisfy the similarity constraint, which tends to cause stronger filtering.

d. Residual Signal Filtering

In the example shown in FIG. 7, system 710 includes residual signal filterer 760. Residual signal filterer 760 filters residual signals obtained from residual signal extractor 740 using a low-pass filter. The filtering that occurs in residual signal filterer 760 is in addition to filtering that occurs in residual signal extractor 740, where the filtering is performed to obtain local contrast values.

In residual signal filterer 760, the filtering is performed to remove undesirable sample values. For example, residual signal filterer 760 uses a 3×3 boxcar filter to remove sample values that are outliers (e.g., sample values that are too bright or too dark, relative to their context), and to remove image noise. In this example, the 3×3 boxcar filter is an equally-weighted average of 9 samples arranged in a 3×3 matrix centered at the "current" pixel position to be filtered, and can be represented as: {{1/9, 1/9, 1/9}, {1/9, 1/9, 1/9}, {1/9, 1/9, 1/9}}. If the signal has opposite sign after the low-pass filtering (e.g. changed from positive to negative), the filtered value is set to "0". The strength of the filtering can vary depending on user settings (e.g., user preference information obtained from optional filter controls 742), and/or depending on other factors. Alternatively, the system uses another filter. As another alternative, residual signal filterer 760 is omitted.

e. Residual Signal Scaling

In the example shown in FIG. 7, system 710 includes residual signal scaler 770. Residual signal scaler 770 scales residual signals (e.g., residual signals obtained from residual signal extractor 740). Residual signal scaling can be adjusted based on user control. For example, user preferences can be represented in parameters obtained from scaling controls 772. Alternatively, scaling controls 772 are omitted.

In one embodiment residual signal scaler 770 applies the scaling function shown in Equation (11), below:

$$S_\Gamma(x) = \min(1, x \cdot S) \; x \in [0,1] \quad (11),$$

where "x" is a sample value in a range of 0 to 1 in an LDR image buffer, and "S" is a user controlled scaling factor. The user controlled scaling factor can take different values, and can take a default value (e.g., 4).

Scaling factors applied by residual signal scaler 770 can be a function of sample values in an LDR image buffer. For example, scaling factors can be low when corresponding sample values in the LDR image buffer are low, or scaling factors can be high when corresponding sample values in the LDR image buffer are high. Scaling that applies scaling factors that depend on sample values (e.g., LDR sample values in an LDR image buffer) can be referred to as relative residual scaling.

In one embodiment, residual signal scaler scales filtered residual signals obtained from residual signal filterer 760. Alternatively, residual signal scaling can be omitted, or applied before residual signal filtering.

f. Dithering

In the example shown in FIG. 7, the system 710 selectively adds dithering signals 782 to sample values. For example, the system determines a dithering offset for the location of the current sample.

The human visual system is relatively sensitive to subtle low-frequency signal level changes, especially in dark image areas, but is not especially sensitive to high-frequency signals. Conventional pre-processing removes high-frequency noise. When a high spatial-temporal frequency dithering signal is added appropriately, however, the human visual system "integrates" the dithering signal with the image signal. This effectively makes the dithering signal perceptually unnoticeable, while smoothing out otherwise perceptible banding artifacts or other artifacts caused by limited bit depth in the images or display. For example, when viewed from a proper distance such as three picture heights, an added dithering signal can create the perception of sample values that are in-between integer values, as the human visual system integrates the sample values together with dithering.

In some implementations, the dithering signals are applied in a final rounding stage of conversion, before clipping to an integer value (e.g., an 8-bit integer value). In other implementations, the dithering signals are applied after clipping. The strength of the dithering signals depends on implementation and can vary adaptively depending on local image characteristics, the characteristics of a highpass signal for the digital image, or other factors. Typically, the signal strength of the dithering signal (or standard variation) is well within an integer level.

g. LDR Image Generation

In the example shown in FIG. 7, system 710 includes LDR image generator 780. LDR image generator 780 generates sample values for the output LDR image 790 based on information obtained in other processing stages. For example, for each sample value in an LDR image buffer, LDR image generator 780 combines the sample value with a residual signal and a high-frequency dithering signal.

In one embodiment, LDR image generator adds together an LDR sample value obtained from and LDR buffer, a residual signal and a dithering signal, rounds the result to an integer, and crops the result to an 8-bit value (e.g., for an image to be displayed on an 8 bpc color monitor). For example, LDR image generator 780 uses the following equation to determine output sample values for the output LDR image 790:

$$\text{output}=\text{Crop}(\text{integer}(\text{LDR buffer value}+\text{residual}+\text{dithering}+0.5),0,255) \quad (12),$$

where sample values obtained from the LDR image buffer are 8-bit integers (representing base 10 values 0-255) and the dithering signals are "blue noises"—values between −0.5 and +0.5—to smooth out rounding operations. In the example shown in Equation (12), 0.5 is added for rounding to the nearest integer. Alternatively, the addition of 0.5 can be omitted. For example, if dithering signals are centered around 0.5, instead of 0, the addition of 0.5 for rounding can be omitted.

h. Extensions and Alternatives

The relationships shown between modules within the system 710 indicate general flows of information in the system; other relationships are not shown for the sake of simplicity. Depending on implementation and the type of processing desired, modules of the system can be added, omitted, split into multiple modules, combined with other modules, and/or replaced with like modules. In alternative embodiments, systems with different modules and/or other configurations of modules perform one or more of the described techniques.

For example, the system 710 can include a decoder to decompress compressed image data. A decoder can be included in the system such that the preprocessor can perform preprocessing operations on decompressed HDR image data. The exact operations performed by the decoder can vary depending on compression format. For example, a JPEG XR-compliant decoder can decompress HDR image information in a JPEG XR file, or a JPEG-compliant decoder can decompress SDR image information in a JPEG file.

The system 710 can also include one or more encoders that compress image data, outputting a bit stream of compressed digital image information. The exact operations performed by the encoder can vary depending on compression format. For example, an encoder can compress the LDR image information according to a format such as JPEG.

C. Approaches for User Interaction and Parameter Control

This section describes approaches to user interaction with systems that generate or render HDR images. For example, user preference information can be applied to HDR image generation, HDR image rendering, or a combination of HDR image generation and HDR image rendering. Although examples described herein refer to user-adjustable controls for use in adjusting parameters relevant to HDR image rendering, user-adjustable controls for use in adjusting parameters relevant to HDR image generation also can be used.

1. Generalized Technique

Figure 9:
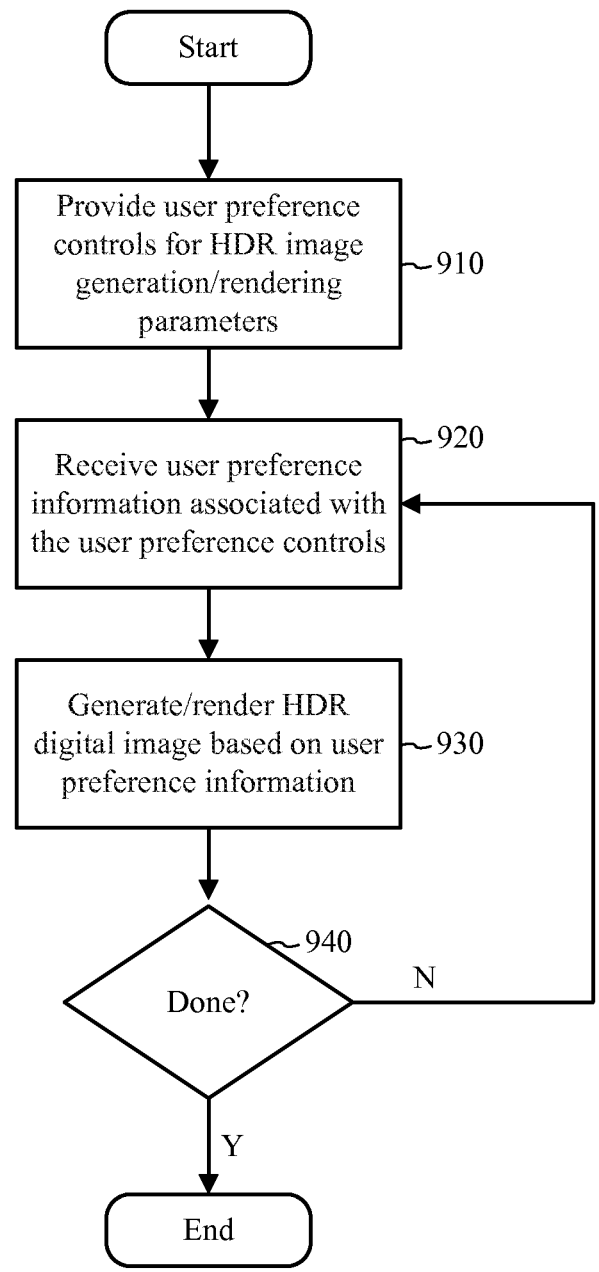
FIG. 9 is a flow chart showing an example technique for processing an HDR image according to user preference information, according to one or more described embodiments.

FIG. 9 shows a technique 900 for processing an HDR image according to user preference information. A system such as the HDR image processing system 1010 shown in FIG. 10 or other system performs the technique 900.

At 910, the system provides one or more user preference controls for setting user preferences for HDR image generation parameters or HDR image rendering parameters. At 920, the system receives user preference information associated with the user preference controls. At 930, the system generates or renders an HDR digital image based at least in part on the user preference information. At 940, if HDR image processing is done, the process ends, or the system can obtain additional user preference information from the same user or from different users, from the same user preference controls or from different user preference controls, to generate or render an HDR digital image in different ways. For example, a user can view an LDR version of an HDR image according to a user preference for gamma adjustment, and then view another LDR version of the HDR image according a user preference for filtering. The original HDR digital image can be preserved as a digital negative to allow future modifications based on original image data.

2. Example Implementations

This section provides implementation details for example implementations of a group of approaches to generating or rendering HDR images according to user preference information.

Figure 10:
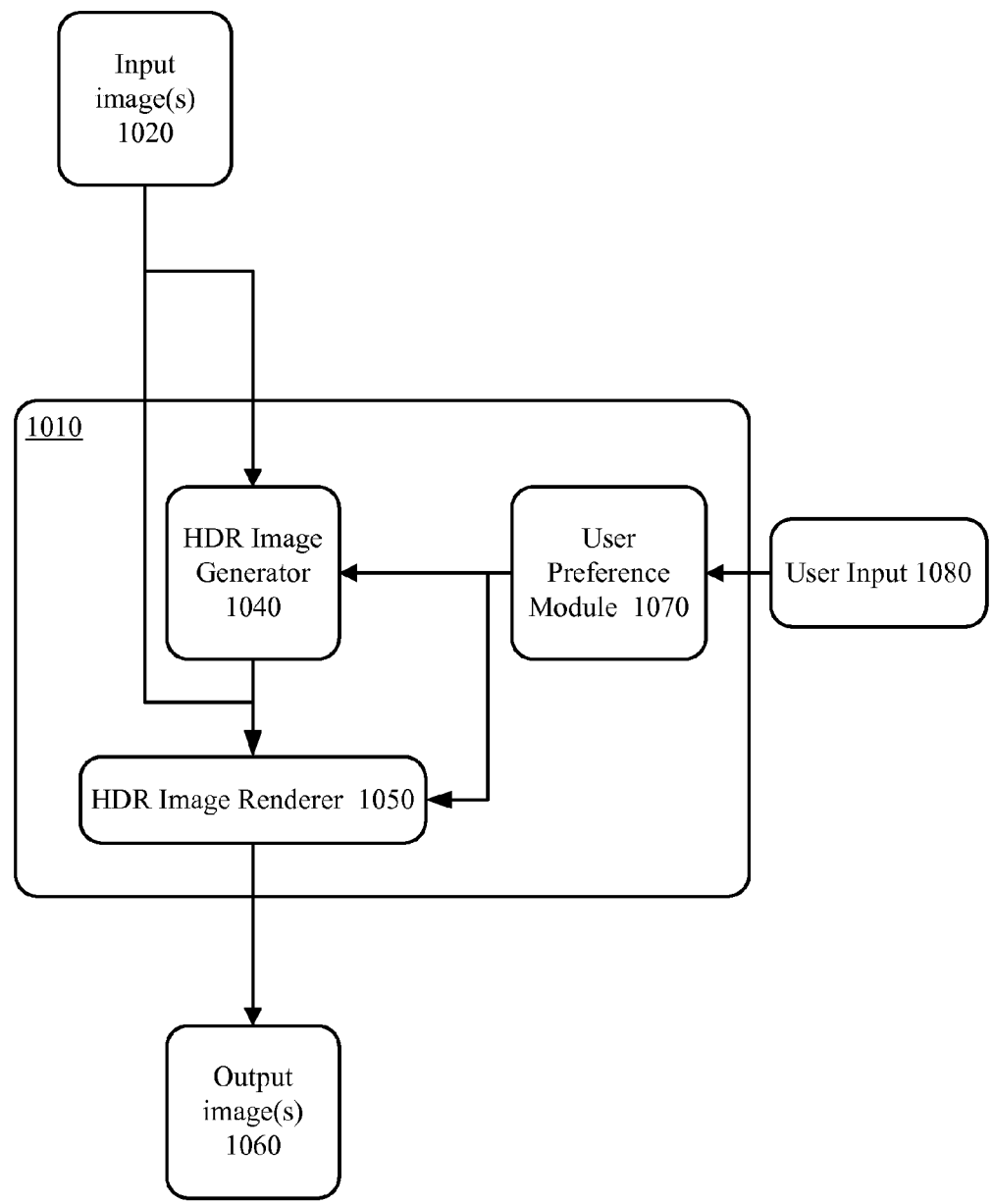
FIG. 10 is a diagram showing an example implementation of an HDR image processing system that generates or renders HDR images according to user preference information, according to one or more described embodiments.

FIG. 10 is a diagram showing an example implementation of an HDR image processing system 1010 that generates or renders HDR images according to user preference information. In the example shown in FIG. 10, system 1010 processes input image(s) 1020. The system 1010 processes an input HDR image for HDR image rendering, or input LDR images for HDR image generation. FIG. 10 shows example modules that implement various processing stages and produce output image(s) 1060. In particular, the system 710 includes a user preference module 1070 for providing a user interface and/or interpreting user input 1080. For example, a user can perform operations on one or more user input devices (e.g., a mouse, keyboard, microphone, eye-tracking device, touchscreen or some other device.) Alternatively, the HDR image processing system 1010 determines user preferences in some other way, such as by receiving user preference metadata stored in image files. User preference module 1070 provides user preference information to HDR image generator 1040 and/or HDR image renderer 1050, depending on the type of processing to be performed.

Individual users can process images in numerous ways, and multiple users can set user preferences for the same image. User preference information can be stored as metadata in image files, without altering the image data. This allows different users to share an image with their own user preferences applied to the image, while preserving the original image data. The user preferences can be used to adjust image processing parameters such as gamma control parameters, residual filter control parameters, residual scaling control parameters, color enhancement parameters, resizing parameters, color temperature control parameters, and white point control parameters. User identification information can also be saved along with corresponding user preference information. Multiple sets of metadata can be stored in an image file so the same picture can be rendered in various ways by different users in the same system.

For example, user preference module 1070 can provide user-adjustable controls to allow users to control parameters for HDR image rendering. Specific controls provided by the user preference module 1070 can vary depending on implementation. For example, referring again to FIG. 7, user adjustable controls for image rendering can include controls for adjusting tone mapping parameters (e.g., gamma controls 734), filter controls 742, and scaling controls 772.

The relationships shown between modules within the system 1010 indicate general flows of information in the system; other relationships are not shown for the sake of simplicity. Depending on implementation and the type of processing desired, modules of the system can be added, omitted, split into multiple modules, combined with other modules, and/or replaced with like modules. In alternative embodiments, systems with different modules and/or other configurations of modules perform one or more of the described techniques.

V. Extensions and Alternatives

This section documents some of the other extensions, alternatives and applications of the techniques and tools presented above.

Described techniques and tools for HDR image generation and rendering can be applied to a down-sampled (i.e. lower-resolution) version of an HDR image for previewing image modifications. For example, tone mapping control parameters and tone mapping operations can be applied to a down-sampled (i.e. lower-resolution) version of an HDR image for previewing image modifications. The same parameters or operations, or different parameters or operations, can then be applied to a full-resolution version of the image (e.g., when generating a final version of the image).

Described techniques and tools for HDR image generation and rendering can be applied to HDR images achieve animation or transition effects, or to reveal different information in the images. For example, and HDR image can be rendered as a series of LDR images each having different tone mapping parameters that allow an animated transition from a low exposure setting to a higher exposure setting, potentially reveal different image details and different exposure settings.

Described techniques and tools for HDR image generation and rendering can be applied to video or to virtual 3D environments.

Described techniques and tools for HDR image generation and rendering can be used in conjunction with other digital image processing techniques and tools. For example, described techniques and tools for HDR image generation and rendering can be used in a digital photo editing scenario to edit HDR images on a computer, e.g., by allowing users to preview image modifications that involve changing tone-mapping parameters in different parts of an HDR image.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

I claim:

1. One or more computer-readable memory or storage devices storing instructions that, when executed by a computing device, perform a method of rendering a high dynamic range digital image as a lower dynamic range digital image, the method comprising:
    tone mapping each of plural sample values in a high dynamic range digital image to a respective lower dynamic range value;
    calculating a local contrast value for each of the tone-mapped sample values;
    deriving a residual signal for each of the tone-mapped sample values, the deriving based at least in part on the respective local contrast value; and
    calculating sample values for a lower dynamic range digital image based at least in part on the tone-mapped sample values and the respective residual signals.

2. The memory or storage devices of claim 1, wherein the method further comprises:
    preprocessing the high dynamic range digital image prior to the tone mapping.

3. The memory or storage devices of claim 1 wherein the tone-mapping comprises:
    generating a global tone mapping lookup table; and
    identifying a lower dynamic range value for each of plural sample values in the high dynamic range digital image;
    wherein the identifying comprises looking up each of the plural sample values in the global tone mapping lookup table.

4. The memory or storage devices of claim 3 wherein the global tone mapping lookup table is generated based on an adaptive gamma function.

5. The memory or storage devices of claim 1 wherein the deriving the residual signal for each of the tone-mapped sample values comprises multiplying each tone-mapped sample value by the respective local contrast value.

6. The memory or storage devices of claim 1, wherein the method further comprises:
    applying filtering to one or more of the residual signals.

7. The memory or storage devices of claim 1, wherein the method further comprises:
    applying scaling to one or more of the residual signals wherein the scaling comprises applying a scaling factor that is a function of the tone-mapped sample value that corresponds to the respective residual signal.

8. The memory or storage devices of claim 1 wherein the sample values for the lower dynamic range digital image are each calculated by combining a tone-mapped sample value, a residual signal and a high-frequency dithering signal.

9. The memory or storage devices of claim 1, wherein the method further comprises:
    identifying a lower dynamic range value for each of plural sample values in a lower resolution preview version of the high dynamic range digital image;
    tone mapping the plural sample values in the lower resolution preview version to the respective identified lower dynamic range value;
    calculating a local contrast value for each of the tone-mapped sample values in the lower resolution preview version;

deriving a residual signal for each of the tone-mapped sample values in the lower resolution preview version, the deriving based at least in part on the respective local contrast value;

calculating sample values for a preview image based at least in part on the tone-mapped sample values in the lower resolution preview version and the respective residual signals.

10. In a computer system, a method of rendering a high dynamic range image based on user preference information, the method comprising:

providing one or more user preference controls for setting user preferences for high dynamic range image rendering parameters;

receiving user preference information associated with a user from the user preference controls, the user preference information corresponding to high dynamic range image rendering parameters for a high dynamic range digital image file containing a high dynamic range digital image; and rendering the high dynamic range digital image based at least in part on the user preference information;

wherein the rendering comprises:

calculating a local contrast value for each of plural tone-mapped sample values;

deriving a residual signal for each of the plural tone-mapped sample values, the deriving being based at least in part on the respective local contrast value; and calculating sample values for a lower dynamic range digital image based at least in part on the plural tone-mapped sample values and the respective residual signals.

11. The method of claim 10 further comprising:

storing the user preference information associated with the user as metadata in the high dynamic range digital image file.

12. The method of claim 11 wherein storing the user preference information as metadata facilitates preserving original high dynamic range digital image information in the file.

13. The memory or storage devices of claim 1, wherein the method further comprises:

applying one or more modified tone mapping parameters to one or more copies of the high dynamic range digital image to obtain modified versions of the lower dynamic range digital image; and producing an animation effect by displaying the lower dynamic range digital image along with the modified versions of the lower dynamic range digital image in a sequence.

14. The method of claim 10 further comprising:

receiving user preference information associated with a second user from the user preference controls; and storing the user preference information associated with the second user as metadata in the high dynamic range digital image file along with the user preference information associated with the first user.

15. A high dynamic range digital image rendering system comprising:

a lookup table containing a plurality of high dynamic range (HDR) digital image sample values and corresponding lower dynamic range (LDR) sample values;

a tone mapper that obtains LDR sample values from the lookup table that correspond to sample values of an HDR digital image being rendered to create tone-mapped sample values;

a residual signal extractor that:
calculates local contrast values for the tone-mapped sample values, and
derives residual signals for the tone-mapped sample values by multiplying the tone-mapped sample values by the corresponding local contrast values;

an LDR image generator that generates samples for an output LDR image based on the tone mapped sample values and the residual signals; and at least one processor that communicates with the tone mapper, residual signal extractor, and LDR image generator to perform the respective functions.

16. The system of claim 15, further comprising a preprocessor that performs digital signal processing operations on the HDR digital image being rendered.

17. The system of claim 15, wherein the LDR sample values obtained by the tone mapper are stored in an LDR image buffer.

18. The system of claim 15, wherein the lookup table LDR sample values are generated using an adaptive gamma function.

19. The system of claim 15, further comprising a residual signal filterer that filters residual signals derived by the residual signal extractor.

20. The system of claim 19, wherein the residual signal filterer applies a 3×3 boxcar filter to remove outlier samples.

21. A computer-implemented method of rendering a high dynamic range digital image as a lower dynamic range digital image, the method comprising:

tone mapping each of plural sample values in a high dynamic range digital image to a respective lower dynamic range value;

calculating a local contrast value for each of the tone-mapped sample values;

deriving a residual signal for each of the tone-mapped sample values, the deriving based at least in part on the respective local contrast value; and calculating sample values for a lower dynamic range digital image based at least in part on the tone-mapped sample values and the respective residual signals.

22. The method of claim 21 wherein the tone-mapping comprises:

generating a global tone mapping lookup table; and
identifying a lower dynamic range value for each of plural sample values in the high dynamic range digital image;
wherein the identifying comprises looking up each of the plural sample values in the global tone mapping lookup table.

23. The method of claim 21, wherein the deriving the residual signal for each of the tone-mapped sample values comprises multiplying each tone-mapped sample value by the respective local contrast value.

24. The method of claim 21, wherein the method further comprises:

applying scaling to one or more of the residual signals wherein the scaling comprises applying a scaling factor that is a function of the tone-mapped sample value that corresponds to the respective residual signal.

* * * * *